United States Patent
Liu

(10) Patent No.: US 10,945,234 B2
(45) Date of Patent: Mar. 9, 2021

(54) SIGNAL RECEPTION METHOD AND APPARATUS

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/346,939

(22) PCT Filed: Nov. 4, 2016

(86) PCT No.: PCT/CN2016/104624
§ 371 (c)(1),
(2) Date: May 2, 2019

(87) PCT Pub. No.: WO2018/082018
PCT Pub. Date: May 11, 2018

(65) Prior Publication Data
US 2020/0059893 A1     Feb. 20, 2020

(51) Int. Cl.
*H04W 72/00* (2009.01)
*H04L 5/00* (2006.01)
(Continued)

(52) U.S. Cl.
CPC ......... *H04W 72/005* (2013.01); *H04L 5/0094* (2013.01); *H04W 56/001* (2013.01); *H04W 72/0446* (2013.01); *H04W 72/0453* (2013.01)

(58) Field of Classification Search
CPC ........... H04W 72/005; H04W 72/0453; H04W 72/0446; H04W 56/001; H04L 5/0094
See application file for complete search history.

(56) References Cited

U.S. PATENT DOCUMENTS

| 2012/0163223 A1* | 6/2012 | Lo | H04L 5/0062 370/252 |
| 2014/0105141 A1* | 4/2014 | Noh | H04L 5/0058 370/329 |

(Continued)

FOREIGN PATENT DOCUMENTS

| CN | 101998647 A | 3/2011 |
| CN | 105359474 A | 2/2016 |

(Continued)

OTHER PUBLICATIONS

International Search Report and Written Opinion of PCT Application No. PCT/CN2016/104624, dated Jul. 6, 2017, issued by the ISA/CN—State Intellectual Property Office of the P.R. China.
(Continued)

*Primary Examiner* — Jamal Javaid
(74) *Attorney, Agent, or Firm* — Finnegan, Henderson, Farabow, Garrett & Dunner, L.L.P.

(57) ABSTRACT

The present disclosure relates to a method and apparatus for receiving signal, which belong to the field of a communication technology. The method comprises the following steps: determining a first frequency domain position and a second frequency domain position; determining a first frequency resource allocated for the first subcarrier spacing and a second frequency resource allocated for the second subcarrier spacing in the frequency band; receiving the signal on the first frequency resource according to the first frequency domain position, and receiving the signal on the second frequency resource according to the second frequency domain position. According to the method and apparatus, expanded service demands of a terminal can be met.

14 Claims, 6 Drawing Sheets

(51) Int. Cl.
  *H04W 56/00*  (2009.01)
  *H04W 72/04*  (2009.01)

(56) References Cited

U.S. PATENT DOCUMENTS

2016/0142919 A1  5/2016  Baldemair et al.
2016/0269212 A1  9/2016  Vilaipornsawai et al.

FOREIGN PATENT DOCUMENTS

| CN | 105979597 A | 9/2016 |
| CN | 105981342 A | 9/2016 |
| CN | 106538019 A | 3/2017 |

OTHER PUBLICATIONS

First Office Action dated Feb. 28, 2019, in counterpart Chinese Application No. 201680001442.5 and English translation thereof.

Second Office Action dated May 8, 2019, in counterpart Chinese Application No. 201680001442.5 and English translation thereof.

Extended European search report of counterpart EP Application No. 16920915.2 dated Jun. 15, 2020.

Samsung, Consideration to Network Energy Efficiency for NR, 3GPP TSG-RAN WG2 Meeting #95, R2-165163, Gothenburg, Aug. 26, 2018, 4 pages.

Sony, Sub-carrier spacing considerations for NR DL Synchronization, 3GPP TSG RAN WG1 Meeting #86bis, R1-1608951, Lisbon, Portugal, Oct. 10-14, 2016, 5 pages.

ZTE, Unified Synchronization Structure, 3GPP TSG RAN WG1 Meeting #86, R1-166422, Gothenburg, Sweden, Aug. 22-26, 2016, 4 pages.

Huawei, et al; Synchronization and initial access mechanism in NR, 3GPP TSG RAN WG1 Meeting #86, R1-166107, Gothenburg, Sweden, Aug. 22-26, 2016, 4 pages.

Examination Report of counterpart Indian Application No. 201937020320 dated Dec. 15, 2020.

* cited by examiner

SIGNAL RECEPTION METHOD AND APPARATUS

CROSS REFERENCE TO RELATED APPLICATIONS

This application is a national phase application based on International Application No. PCT/CN2016/104624, filed Nov. 4, 2016, the content of which is incorporated herein by reference.

TECHNICAL FIELD

The present disclosure relates to the field of a communication technology, and more particularly, to a signal reception method and apparatus.

TECHNICAL BACKGROUND

A terminal needs to receive a synchronization signal first when performing cell search, and after realizing synchronization with a cell in frequency and time according to the synchronization signal, receives a broadcast signal to complete the cell search. The broadcast signal includes system information of the cell.

The current communication systems are designed for the needs of eMBB (enhanced Mobile Broad Band). A subcarrier spacing in the communication system is uniformly set to 15 kHz, and the relative positions of the synchronization signal and the broadcast signal on the time-frequency and frequency resources are fixed. Therefore, the terminal can perform scanning according to the subcarrier spacing and the positions to receive the synchronization signal and the broadcast signal.

SUMMARY

In order to solve the problem in the related art, embodiments of the present disclosure provide methods and apparatuses for receiving a signal.

According to a first aspect of embodiments of the present disclosure, a method for receiving a signal is provided, and is applied to a terminal supporting a first system signal configuration and a second system signal configuration, a first subcarrier spacing in the first system signal configuration being different from a second subcarrier spacing in the second system signal configuration: the method comprising:

determining, according to a frequency band which the terminal supports, a first frequency domain position, corresponding to the first subcarrier spacing, of a signal to be received and a second frequency domain position, corresponding to the second subcarrier spacing, of the signal, the signal being a synchronization signal or a basic broadcast signal;

determining a first frequency resource allocated for the first subcarrier spacing and a second frequency resource allocated for the second subcarrier spacing in the frequency band; and receiving the signal on the first frequency resource according to the first frequency domain position, and receiving the signal on the second frequency resource according to the second frequency domain position Optionally, wherein the signal is a synchronization signal, when part of the signal is received on the first frequency resource, the method further comprises:

determining, according to a current first time domain position of the signal, a second time domain position of next occurrence of the signal on the second frequency resource; when the second time domain position is reached, receiving the signal on the first frequency resource according to the first frequency domain position, and receiving the signal on the second frequency domain resource according to the second frequency domain position, the second time domain position being earlier than a third time domain position of next occurrence of the signal on the first frequency resource.

Optionally, wherein the signal is a synchronization signal, when part of the signal is received on the second frequency resource, the method further comprises:

determining, according to a current fourth time domain position of the signal, a fifth time domain position of next occurrence of the signal on the first frequency resource: when the fifth time domain position is reached, receiving the signal on the first frequency resource according to the first frequency domain position, and receiving the signal on the second frequency domain resource according to the second frequency domain position, the fifth time domain position is earlier than a sixth time domain position of next occurrence of the signal on the second frequency resource.

Optionally, wherein the determining a first frequency domain position, corresponding to the first subcarrier spacing, of a signal to be received and a second frequency domain position, corresponding to the second subcarrier spacing, of the signal, comprises:

shifting a preset frequency resource block located at a center frequency point of the frequency band upwardly by a first threshold corresponding to the first subcarrier spacing, to obtain a first frequency resource block, and determining the first frequency domain position of the signal according to a first positional relationship between the signal and the first frequency resource block: and shifting the preset frequency resource block downwardly by a second threshold corresponding to the second subcarrier spacing, to obtain a second frequency resource block, and determining the second frequency domain position of the signal according to a second positional relationship between the signal and the second frequency resource block.

Optionally, wherein the receiving the signal on the first frequency resource according to the first frequency domain position, and receiving the signal on the second frequency resource according to the second frequency domain position, comprises:

determining a first frequency grid corresponding to the first subcarrier spacing and a second frequency grid corresponding to the second subcarrier spacing: and scanning, on the first frequency resource, the signal at intervals of the first frequency grid via a first scanning window having the same size as the first frequency resource block; and scanning, on the second frequency resource, the signal at intervals of the second frequency grid via a second scanning window having the same size as the second frequency resource block.

Optionally, when the signal is a synchronization signal, and the synchronization signal is received on both the first frequency resource and the second frequency resource; the method further comprising:

determining, according to the synchronization signal received on the first frequency resource, a third frequency domain position and a seventh time domain position of a basic broadcast signal which appears on the first frequency resource, and determining, according to the synchronization signal received on the second frequency resource, a fourth frequency domain position and an eighth time domain position of the basic broadcast signal which appears on the second frequency resource; and receiving the basic broadcast signal on the first frequency resource according to the third frequency domain position and the seventh time domain position, and receiving the basic broadcast signal on the second frequency resource according to the fourth frequency domain position and the eighth time domain position.

Optionally, when the signal is a synchronization signal, and the synchronization signal is received only on the first frequency resource: the method further comprises:

determining, according to the synchronization signal, a fifth frequency domain position and a ninth time domain position of the basic broadcast signal which appears on the first frequency resource, and determining, according to the ninth time domain position, a tenth time domain position of the basic broadcast signal which appears on the second frequency resource, receiving the basic broadcast signal on the first frequency resource according to the fifth frequency domain position and the ninth time domain position, and receiving the basic broadcast signal on the second frequency resource according to the tenth time domain position.

Optionally, when the signal is a synchronization signal, and the synchronization signal is received only on the second frequency resource; the method further comprises:

determining, according to the synchronization signal, a sixth frequency domain position and an eleventh time domain position of the basic broadcast signal which appears on the second frequency resource, and determining, according to the eleventh time domain position, a twelfth time domain position of the basic broadcast signal which appears on the first frequency resource, receiving the basic broadcast signal on the second frequency resource according to the sixth frequency domain position and the eleventh time domain position, and receiving the basic broadcast signal on the first frequency resource according to the twelfth time domain position.

According to a second aspect of embodiments of the present disclosure, an apparatus for receiving a signal is applied to a terminal supporting a first system signal configuration and a second system signal configuration, a first subcarrier spacing in the first system signal configuration being different from a second subcarrier spacing in the second system signal configuration; the apparatus comprising:

a first determination module configured to determine, according to a frequency band which the terminal supports, a first frequency domain position, corresponding to the first subcarrier spacing, of a signal to be received and a second frequency domain position, corresponding to the second subcarrier spacing, of the signal, the signal being a synchronization signal or a basic broadcast signal;

a second determination module configured to determine a first frequency resource allocated for the first subcarrier spacing and a second frequency resource allocated for the second subcarrier spacing in the frequency band; and a first reception module configured to receive the signal on the first frequency resource determined by the second determination module according to the first frequency domain position determined by the first determination module, and receive the signal on the second frequency resource determined by the second determination module according to the second frequency domain position determined by the first determination module.

Optionally, when the signal is the synchronization signal, the apparatus further comprises:

a second reception module configured to, when part of the content of the signal is received on the first frequency resource, determine, according to a current first time domain position of the signal, a second time domain position of next occurrence of the signal on the second frequency resource: when the second time domain position is reached, receive the signal on the first frequency resource according to the first frequency domain position, and receive the signal on the second frequency domain resource according to the second frequency domain position, the second time domain position being earlier than a third time domain position of the signal which appears on the first frequency resource next time; or a third reception module configured to, when part of the signal is received on the second frequency resource, determine, according to a current fourth time domain position of the signal, a fifth time domain position of next occurrence of the signal on the first frequency resource: when the fifth time domain position is reached, receive the signal on the first frequency resource according to the first frequency domain position, and receive the signal on the second frequency domain resource according to the second frequency domain position, the fifth time domain position being earlier than a sixth time domain position of the signal which appears on the second frequency resource next time.

Optionally, the first determination module comprises:

a first determination submodule configured to shift a preset frequency resource block located at a center frequency point of the frequency band upwardly by a first threshold corresponding to the first subcarrier spacing, to obtain a first frequency resource block, and determine the first frequency domain position of the signal according to a first positional relationship between the signal and the first frequency resource block, and a second determination submodule configured to shift the preset frequency resource block downwardly by a second threshold corresponding to the second subcarrier spacing, to obtain a second frequency resource block, and determine the second frequency domain position of the signal according to a second positional relationship between the signal and the second frequency resource block.

Optionally, wherein the apparatus comprises:

a third determination submodule configured to determine a first frequency grid corresponding to the first subcarrier spacing and a second frequency grid corresponding to the second subcarrier spacing: and a reception submodule configured to scan, on the first frequency resource, the signal at intervals of the first frequency grid via a first scanning window having the same size as the first frequency resource block: and scan, on the second frequency resource, the signal at intervals of the second frequency grid via a second scanning window having the same size as the second frequency resource block.

Optionally, the apparatus further comprises:

a third determination module configured to, when the signal is a synchronization signal and the synchronization signal is received on the first frequency resource and the second frequency resource, determine, according to the synchronization signal received on the first frequency resource, a third frequency domain position and a seventh time domain position of the basic broadcast signal which appears on the first frequency resource; and determine, according to the synchronization signal received on the second frequency resource, a fourth frequency domain position and an eighth time domain position of the basic broadcast signal which appears on the second frequency resource; and a fourth reception module configured to receive the basic broadcast signal on the first frequency resource according to the third frequency domain position and the seventh time domain position determined by the third determination module, and receive the basic broadcast signal on the second frequency resource according to the fourth frequency domain position and the eighth time domain position.

Optionally, the apparatus further comprises:

a fifth reception module configured to, when the signal is a synchronization signal and the synchronization signal is received only on the first frequency resource, determine, according to the synchronization signal, a fifth frequency domain position and a ninth time domain position of the basic broadcast signal which appears on the first frequency resource, and determine, according to the ninth time domain position, a tenth time domain position of the basic broadcast signal which appears on the second frequency resource; receive the basic broadcast signal on the first frequency resource according to the fifth frequency domain position and the ninth time domain position, and receive the basic broadcast signal on the second frequency resource according to the tenth time domain position; or a sixth reception module configured to, when the signal is a synchronization signal and the synchronization signal is received only on the second frequency resource, determine, according to the synchronization signal, a sixth frequency domain position and an eleventh time domain position of the basic broadcast signal which appears on the second frequency resource, and determine, according to the eleventh time domain position, a twelfth time domain position of the basic broadcast signal which appears on the first frequency resource: receive the basic broadcast signal on the second frequency resource according to the sixth frequency domain position and the eleventh time domain position, and receive the basic broadcast signal on the first frequency resource according to the twelfth time domain position.

According to a third aspect of embodiments of the present disclosure, an apparatus for receiving a signal is applied to a terminal supporting a first system signal configuration and a second system signal configuration, a first subcarrier spacing in the first system signal configuration being different from a second subcarrier spacing m the second system signal configuration: the apparatus comprising:

a processor;

a memory for storing executable instructions of the processor, wherein the processor is configured to:

determine, according to a frequency band which the terminal supports, a first frequency domain position, corresponding to the first subcarrier spacing, of a signal to be received and a second frequency domain position, corresponding to the second subcarrier spacing, of the signal, the signal being a synchronization signal or a basic broadcast signal;

determine a first frequency resource allocated for the first subcarrier spacing and a second frequency resource allocated for the second subcarrier spacing in the frequency band, and receive the signal on the first frequency resource according to the first frequency domain position, and receive the signal on the second frequency resource according to the second frequency domain position. The technical solutions provided by the present disclosure may include the following benefits:

The first frequency domain position, corresponding to the first subcarrier spacing, of the signal to be received and the second frequency domain position, corresponding to the second subcarrier spacing, of the signal are determined according to the frequency band which the terminal supports. The first frequency resource allocated for the first subcarrier spacing and the second frequency resource allocated for the second subcarrier spacing in the frequency band are determined. The signal is received on the first frequency resource according to the first frequency domain position, and the signal is received on the second frequency resource according to the second frequency domain position; such that the terminal supports two system signal configurations, and the subcarrier spacings in the system signal configurations are different, the signal can be received simultaneously on the frequency resources corresponding to the two subcarrier spacings. Therefore, the problem, which is caused by the terminal receives a signal only on a frequency resource corresponding to one subcarrier spacing, that the terminal could not meet the multiple service demands is solved, and expanded service demands of a terminal can be met.

When part of the signal is received on the first frequency resource, a second time domain position of next occurrence of the signal on the second frequency resource is determined according to the current first time domain position of the signal. Since the second time domain position is earlier than a third time domain position of next occurrence of the symbolization signal on the first frequency resource, the terminal may shorten the period of receiving the synchronization signal, thereby improving the reception efficiency of the synchronization signal.

The above general description and the following detailed description are merely exemplary and are not limiting of the disclosure.

BRIEF DESCRIPTION OF THE DRAWINGS

The drawings herein, which are integrated into the description and constitute a part of the description of the present disclosure, show the embodiments of the present disclosure and are intended to explain the principle of the present disclosure together with the description.

DETAILED DESCRIPTION

Figure 1:
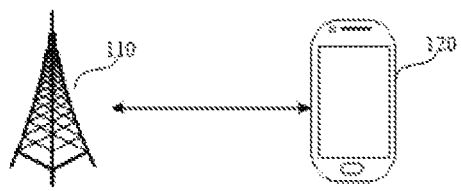
FIG. 1 is a block diagram of a system for receiving a signal involved in each embodiment.

Hereinafter, exemplary embodiments will be described in detail. The embodiments are shown in the drawings. In the following description when referring to the drawings, the same numerals in the different drawings denote the same or similar elements unless otherwise indicated. The embodiments described in the following exemplary embodiments are not representative of all embodiments consistent with the present disclosure. Rather, they are merely examples of apparatuses and methods consistent with some aspects of the present disclosure as detailed in the appended claims.

FIG. 1 illustrates a block diagram of a system for receiving a signal involved in each embodiment of the present disclosure. The system for receiving a signal includes a base station 110 and a terminal 120. A connection is established between the base station 110 and the terminal 120.

The system for receiving a signal may be applied to 5G (Fifth Generation). Since service demands proposed by 5G include: eMBB, URLLC (Ultra Reliable & Low Latency Communication), and mMTC (Massive Machine Type Communication), and the service demand of URLLC has a relatively high requirement on latency, a subcarrier spacing of 15 kHz configured for the service demand of eMBB cannot meet the service demand of URLLC, and thus a subcarrier spacing greater than 15 kHz needs to be configured for the URLLC.

The terminal 120 supports the service demands of eMBB and URLLC. Since the subcarrier spacings corresponding to the two service demands are different, the terminal 120 needs to separately perform system signal configurations on the two service demands. After the configurations are performed successfully, the terminal 120 may receive, according to the two configurations, a signal transmitted by the base station 110, thereby communicating with the base station 110.

Since each service demand corresponds to one system signal configuration, for ease of distinguishing, the two system signal configurations are named as a first system signal configuration and a second system signal configuration. The system signal configuration corresponding to the service demand of eMBB is referred to as the first system signal configuration, and the system signal configuration corresponding to the service demand of URLLC is referred to as the second system signal configuration. Alternatively, the system signal configuration corresponding to the service demand of URLLC is referred to as the first system signal configuration and the system signal configuration corresponding to the service demand of eMBB is referred to as the second system signal configuration. A first subcarrier spacing in the first system signal configuration is different from a second subcarrier spacing in the second system signal configuration.

Figure 2:
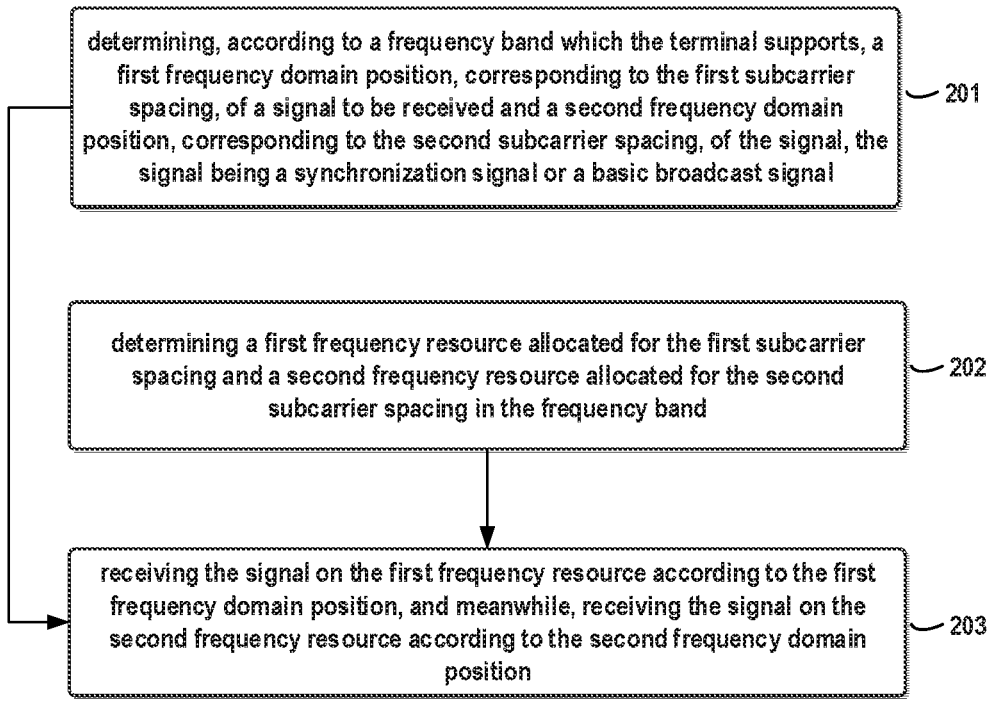
FIG. 2 is a flowchart of a method for receiving a signal in accordance with an exemplary embodiment.

FIG. 2 is a flowchart of a method for receiving a signal in accordance with an exemplary embodiment. The method for receiving a signal is applied to the terminal 120 as shown in FIG. 1. As shown in FIG. 2, the method for receiving a signal includes the following steps.

In step 201, determining, according to a frequency band which the terminal supports, a first frequency domain position, corresponding to the first subcarrier spacing, of a signal to be received and a second frequency domain position, corresponding to the second subcarrier spacing, of the signal, the signal being a synchronization signal or a basic broadcast signal.

The synchronization signal includes a PSS (Primary Synchronization Signal) and an SSS (Secondary Synchronization Signal). After receiving the synchronization signal, the terminal performs frequency and time synchronization with the base station for receiving of the basic broadcast signal later.

The basic broadcast signal carries primary broadcast information, or the basic broadcast signal carries primary broadcast information and system information blocks. In an exemplary implementation, the primary broadcast information includes a system bandwidth, a system frame number, and a PHICH (Physical Hybrid ARQ Indicator Channel) configuration. The system information blocks may be allocated according to service demands, for example, a system information block for cell radio configuration, a system information block for cell reselection, and the like, which will not be limited in this embodiment.

The first frequency domain position is a frequency domain position where the signal is located when the signal is transmitted at the first subcarrier spacing, and the second frequency domain position is a frequency domain position where the signal is located when the signal is transmitted at the second subcarrier spacing.

In step 202, determining a first frequency resource allocated for the first subcarrier spacing and a second frequency resource allocated for the second subcarrier spacing in the frequency band.

For example, when the terminal supports a frequency band of 1901 MHz to 2000 MHz, and frequency resources are equally allocated, the first frequency resource may be in a frequency band of 1901 MHz to 1950 MHz, and the second frequency resource may be in a frequency band of 1951 MHz to 2000 MHz.

In step 203, receiving the signal on the first frequency resource according to the first frequency domain position, and receiving the signal on the second frequency resource according to the second frequency domain position.

Since the terminal cannot determine a time domain position of the signal, the terminal may blindly search for the signal on the first frequency resource according to the first frequency domain position, and blindly search for the signal on the second frequency resource according to the second frequency domain position.

In summary, according to the method for receiving a signal provided by the present disclosure, the first frequency domain position, corresponding to the first subcarrier spacing, of the signal to be received and the second frequency domain position, corresponding to the second subcarrier spacing, of the signal are determined according to the frequency band which the terminal supports. The first frequency resource allocated for the first subcarrier spacing and the second frequency resource allocated for the second subcarrier spacing in the frequency band are determined. The signal is received on the first frequency resource according to the first frequency domain position, and the signal is received on the second frequency resource according to the second frequency domain position, such that the terminal supports two system signal configurations. In addition, when the subcarrier spacings in the system signal configurations are different, the signal can be received simultaneously on the frequency resources corresponding to the two subcarrier spacings. Therefore, the problem, which caused by receiving a signal on a frequency resource corresponding to one subcarrier spacing, that the terminal could not meet the multiple service demands is solved, and expanded service demands of a terminal can be met.

In the present disclosure, the signal received by the terminal may be a synchronization signal or a basic broadcast signal. The receiving process of these two signals will be described in detail below.

Figure 3:
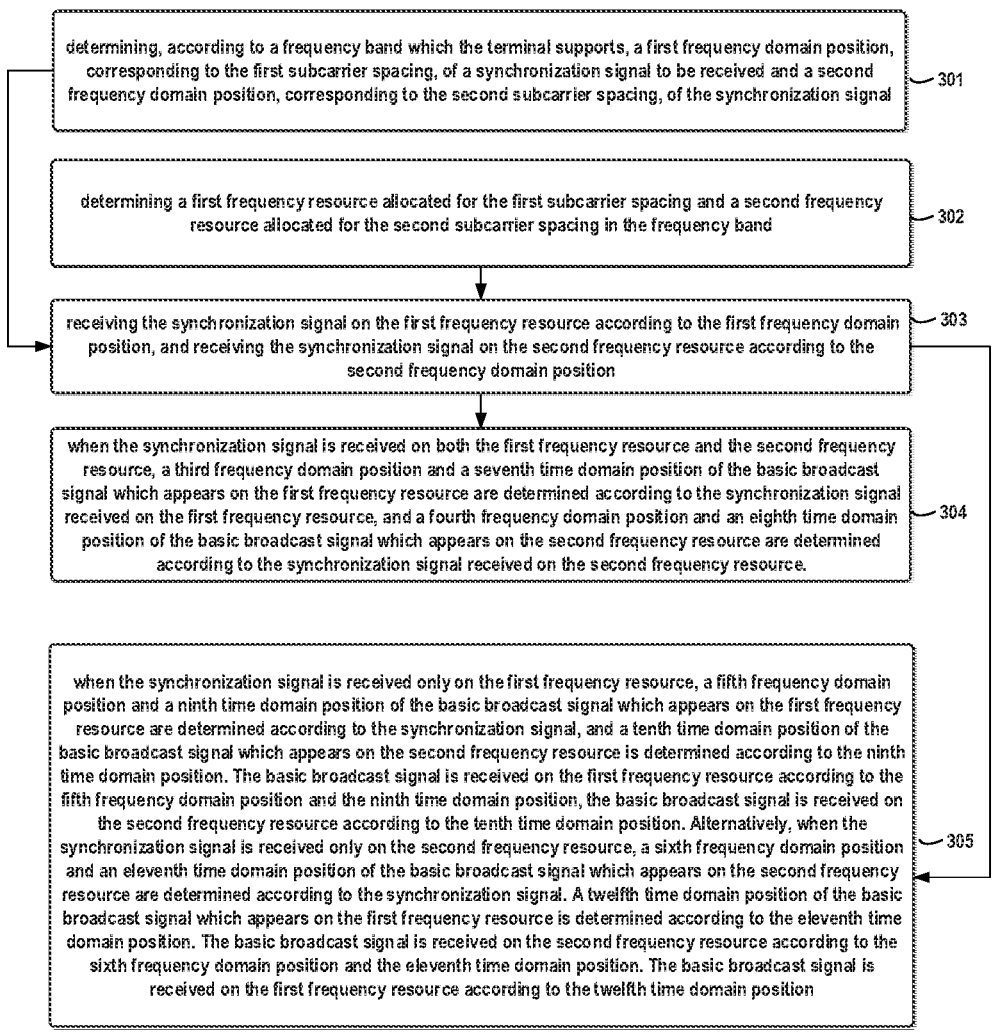
FIG. 3 is a flowchart of a method for receiving a signal in accordance with another exemplary embodiment.

FIG. 3 is a flowchart of a method for receiving a signal in accordance with another exemplary embodiment. The method for receiving a signal is applied to the terminal 120 shown in FIG. 1 and the signal is a synchronization signal. As shown in FIG. 3, the method for receiving a signal includes the following steps.

In step 301, determining, according to a frequency band which the terminal supports, a first frequency domain position, corresponding to the first subcarrier spacing, of a synchronization signal to be received and a second frequency domain position, corresponding to the second subcarrier spacing, of the synchronization signal.

For the definitions of the synchronization signal, the first frequency domain position and the second frequency domain position, refer to the description in step 201, and will not be described herein again.

The first subcarrier spacing is configured for the service demand of eMBB and is 15 kHz; and the second subcarrier spacing is configured for the service demand of URLLC, and is greater than 15 kHz, for example, 60 kHz. Alternatively, the first subcarrier spacing is configured for the service demand of URLLC, and is greater than 15 kHz, for example, 60 kHz; the second subcarrier spacing is configured for the service demand of eMBB and is 15 kHz.

Since the frequency band which each terminal supports is fixed, and the frequency domain position of the synchronization signal in the frequency band is predefined, the terminal may determine the first frequency domain position and the second frequency domain position according to the frequency band.

In an exemplary implementation, the step of determining the first frequency domain position, corresponding to the first subcarrier spacing, of the synchronization signal to be received and the second frequency domain position, corresponding to the second subcarrier spacing, of the synchronization signal includes: obtaining a first frequency resource block, by shifting a preset frequency resource block located at a center frequency point of the frequency band upwardly by a first threshold corresponding to the first subcarrier spacing, and determining the first frequency domain position of the synchronization signal according to a first positional relationship between the synchronization signal and the first frequency resource block; and shifting the preset frequency resource block downwardly by a second threshold corresponding to the second subcarrier spacing, to obtain a second frequency resource block, and determining the second frequency domain position of the synchronization signal according to a second positional relationship between the synchronization signal and the second frequency resource block.

In the related art, the process by which the terminal determines the frequency domain position of the synchronization signal is as follows: determining, by the terminal, six RBs (Resource Blocks) located at the center in the frequency band which the terminal supports, and using the six RBs as preset frequency resource blocks located at a central frequency point; then, reading a positional relationship between the synchronization signal and each preset frequency resource block respectively, and determining the frequency domain position of the synchronization signal in the preset frequency resource block according to the positional relationship. For example, for a FDD (Frequency Division Duplex) terminal, the positional relationship lies in that a PSS appears periodically on middle 62 subcarriers of a last OFDM (Orthogonal Frequency Division Multiplexing) symbol in time slot 0 and time slot 10, and an SSS appears periodically on middle 62 subcarriers of a second last OFDM symbol in the time slot 0 and the time slot 10. For a TDD (Time Division Duplex) terminal, the positional relationship lies in that the PSS appears periodically on middle 62 subcarriers of a third OFDM symbol in subframe 1 and subframe 6, and the SSS appears periodically on middle 62 subcarriers of a last OFDM symbol in subframe 0 and subframe 5.

In this embodiment, when determining the first frequency resource block and the second frequency resource block, the terminal may shift the preset frequency resource block upwardly by a first threshold corresponding to the first subcarrier spacing to obtain a first frequency source block, and shift the preset frequency resource block downwardly by a second threshold corresponding to the second subcarrier spacing to obtain a second frequency resource block. The first threshold and the second threshold may be equal or may not be equal. In addition, the positive and negative relationship between the first threshold and the second threshold is not limited. For example, 6 RBs located at the center are shifted upwardly by x to obtain 6 RBs whose first frequency resources are "center+x", whereas the 6 RBs located at the center are shifted downwardly by x to obtain 6 RBs whose second frequency resources are "center−x".

The first positional relationship may be the same as or different from the positional relationship in the related art. The second positional relationship may be the same as or different from the positional relationship in the related art. In addition, the first positional relationship and the second positional relationship may be the same or different, and will not be limited in this embodiment.

In step 302, determining a first frequency resource allocated for the first subcarrier spacing and a second frequency resource allocated for the second subcarrier spacing in the frequency band.

The terminal allocates a part of the frequency resources in the frequency band as the first frequency resource, and allocates the remaining frequency resources in the frequency band as the second frequency resource. For example, when the terminal supports a frequency band of 1901 MHz to 2000 MHz and the frequency resources are equally allocated, the first frequency resource may be in a frequency band of 1901 MHz to 1950 MHz. and the second frequency resource may be in a frequency band of 1951 MHz to 2000 MHz.

In step 303, receiving the synchronization signal on the first frequency resource according to the first frequency domain position, and receiving the synchronization signal on the second frequency resource according to the second frequency domain position.

Since the terminal cannot determine a time domain position of the synchronization signal, the terminal may blindly search for the synchronization signal on the first frequency resource according to the first frequency domain position, and blindly search for the synchronization signal on the second frequency resource according to the second frequency domain position.

In an exemplary implementation, the terminal determines a first frequency grid corresponding to the first subcarrier spacing and a second frequency grid corresponding to the second subcarrier spacing. The synchronization signal is scanned on the first frequency resource at intervals of the first frequency grid via a first scanning window having the same size as the first frequency resource block. And the synchronization signal is scanned on the second frequency resource at intervals of the second frequency grid via a second scanning window having the same size as the second frequency resource block.

The frequency grid is the smallest unit of a spacing between frequency points. For example, the frequency grid corresponding to the subcarrier spacing of 15 kHz is 100 kHz. There is a corresponding relationship between the subcarrier spacing and the frequency grid, the terminal may determine the first frequency grid according to the first subcarrier spacing and the corresponding relationship, and determine the second frequency grid according to the second subcarrier spacing and the corresponding relationship.

Optionally, the terminal may also calculate a frequency grid according to two subcarrier spacings and the other frequency grids. For example, when the first subcarrier spacing is 15 kHz, the second subcarrier spacing is 60 kHz, and the first frequency grid is 100 kHz, the second frequency grid is 100×(60/15)=400 kHz.

Since the synchronization signal is located in the first frequency resource block and the second frequency resource block, the terminal may determine the first scanning window having the same size as the first frequency resource block, and scan the synchronization signal at intervals of the first frequency grid via the first scanning window. And the terminal may determine the second scanning window having the same size as the second frequency resource block, and scan the synchronization signal at intervals of the second frequency grid via the second scanning window. The scanning process will not be defined in this embodiment. In this case, the frequency grid is the minimum moving distance of the scanning window.

For example, the first frequency resource block includes 6 RBs, the first frequency grid is 100 kHz, and the first frequency resource is 1901 MHz to 1950 MHz. Then, the terminal receives the synchronization signal in the frequency band of 1901 MHz to 1950 MHz by using the scanning windows of the 6 RBs with a moving distance of 100 kHz.

Figure 4:
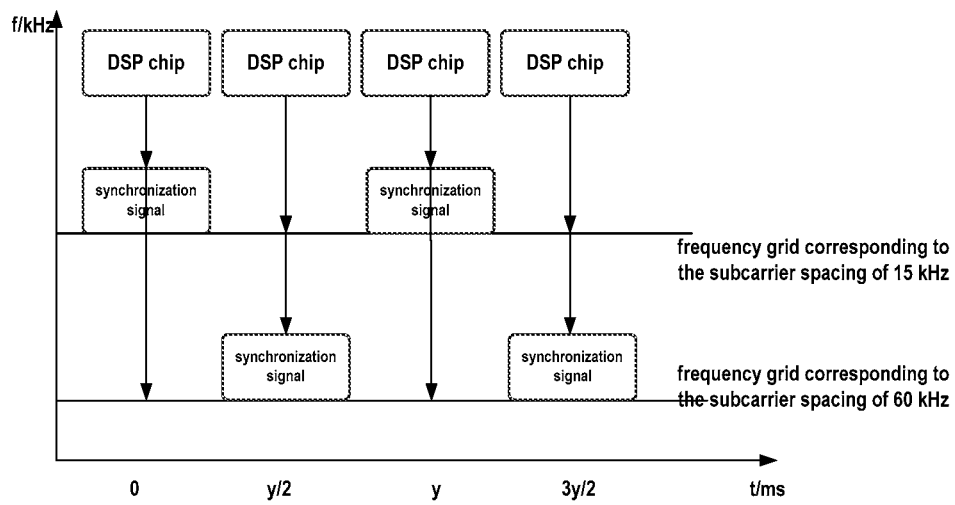
FIG. 4 is a schematic diagram when a synchronization signal is received in accordance with an exemplary embodiment.

Referring to FIG. 4 which shows a schematic diagram of receiving a synchronization signal, the description will be made by an example that the first subcarrier spacing of 15 kHz, and the second subcarrier spacing of 60 kHz, the period of the synchronization signal on each subcarrier is y ms, and the period of the synchronization signal on different subcarriers is y/2 ms. Since the terminal simultaneously receives the synchronization signal on frequency resources corresponding to the two subcarrier spacings respectively, two overlapping arrows shown in FIG. 4 are used to indicate that a DSP (Digital Signal Processing) chip simultaneously receives the synchronization signal on the frequency resources corresponding to two subcarrier spacings respectively at a same time slot position.

When the terminal receives the complete synchronization signal in a first blindly searching, the terminal performs step 304 or 305. When the terminal receives part of the synchronization signal in a first blindly searching, the terminal may further determine, according to a period of the synchronization signal, a time domain position of next occurrence of the synchronization signal, receive the synchronization signal on the frequency resource according to the frequency domain position and the time domain position of the synchronization signal, and then perform step 304 or 305.

Since the terminal may receive part of the synchronization signal on the first frequency resource, or may receive part of the synchronization signal on the second frequency resource, the two cases are described in detail below, respectively.

In a first implementation, when part of the signal is received on the first frequency resource, a second time domain position of next occurrence of the signal on the second frequency resource, is determined according to a current first time domain position of the signal. When the second time domain position is reached, the signal is received on the first frequency resource according to the first frequency domain position, and the signal is received on the second frequency resource according to the second frequency domain position. The second time domain position is earlier than a third time domain position of next occurrence of the signal on the first frequency resource.

Since a period between the synchronization signals is fixed, when receiving part of the synchronization signals, the terminal may calculate a second time domain position of next occurrence of the synchronization signal which is transmitted by the base station, thereby receiving the synchronization signal according to the second time domain position, without continuing to blindly search for the synchronization signal, such that resources are saved. In addition, the base station transmits the synchronization signal on the first frequency resource and the second frequency resource alternately. In this way, the period of the synchronization signals transmitted on different frequency resources is one-half of the original period. When the terminal receives part of the synchronization signal on one frequency resource, the terminal may receive the synchronization signal on the other frequency resource after waiting for one-half of the period, rather than receiving the synchronization signal on the same frequency resource after waiting for one period. Therefore, the reception efficiency of the synchronization signal can be enhanced.

Referring to FIG. 4, assuming that the terminal receives part of the synchronization signal on the frequency resource corresponding to the subcarrier spacing of 15 kHz at the current time, it may be determined that the time domain position of the synchronization signal on the frequency resource corresponding to the subcarrier spacing of 60 kHz is y/2 ms. After waiting for y/2 ms, the terminal receives the synchronization signal on the frequency resource corresponding to the subcarrier spacing of 60 kHz, rather than receiving the synchronization signal on the frequency resource corresponding to the subcarrier spacing of 15 kHz after waiting for y ms.

In a second implementation, when part of the signal is received on the second frequency resource, a fifth time domain position of next occurrence of the signal on the first frequency resource is determined according to a current fourth time domain position of the signal. When the fifth time domain position is reached, the signal is received on the first frequency resource according to the first frequency domain position, and the signal is received on the second frequency domain resource according to the second frequency domain position. The fifth time domain position is earlier than a sixth time domain position of next occurrence of the signal on the second frequency resource.

The second implementation differs from the first implementation in the frequency resource on which part of the synchronization signal is received. The two implementations are similar, and will not be described herein.

After receiving the synchronization signal, the terminal also needs to continue to receive a basic broadcast signal according to the synchronization signal. The method for receiving the basic broadcast signal is related to the method for transmitting the synchronization signal. The method for receiving the basic broadcast signal will be described in detail below.

In step 304, when the synchronization signal is received on both the first frequency resource and the second frequency resource, a third frequency domain position and a seventh time domain position of the basic broadcast signal which appears on the first frequency resource are determined according to the synchronization signal received on the first frequency resource, and a fourth frequency domain position and an eighth time domain position of the basic broadcast signal which appears on the second frequency resource are determined according to the synchronization signal received on the second frequency resource. The basic broadcast signal is received on the first frequency resource according to the third frequency domain position and the seventh time domain position. The basic broadcast signal is received on the second frequency resource according to the fourth frequency domain position and the eighth time domain position.

The terminal receives the synchronization signal on both the first frequency resource and the second frequency resource, which means that the terminal alternately receives the synchronization signal on the first frequency resource and the second frequency resource, please refer to FIG. 4.

After receiving the synchronization signal, the terminal may determine the frequency domain position of the basic broadcast signal first according to the synchronization signal, then determine the time frequency position of the basic broadcast signal, and receive the basic broadcast signal on the frequency resource according to the frequency domain position and the time domain position. The synchronization signal received on the first frequency resource may indicate a time-frequency position of the basic broadcast signal transmitted on the first frequency resource. The synchronization signal received on the second frequency resource may indicate a time-frequency position of the basic broadcast signal transmitted on the second frequency resource.

Figure 5:
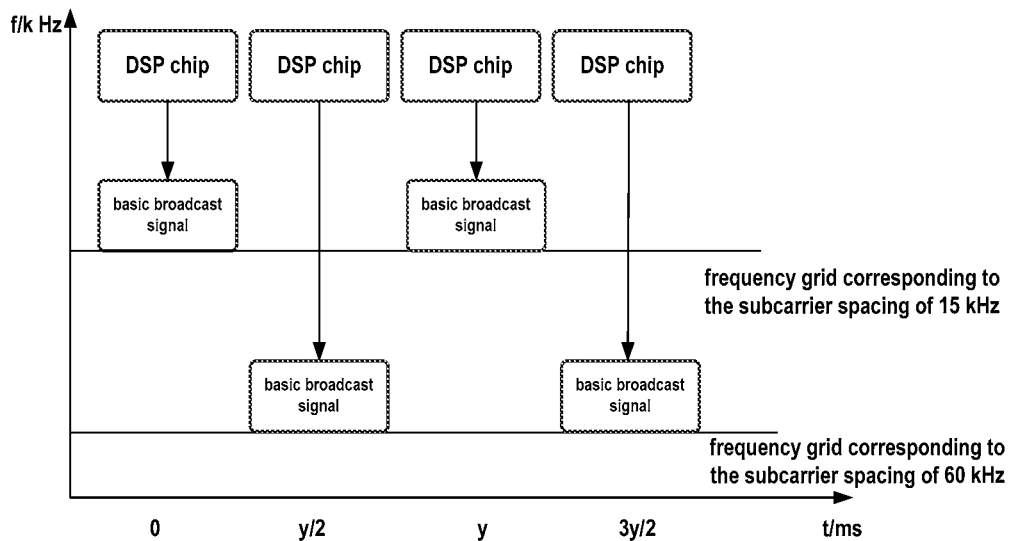
FIG. 5 is a schematic diagram when a basic broadcast signal is received in accordance with an exemplary embodiment.

It should be noted that: since the time-frequency position of the basic broadcast signal on each frequency resource is known, the terminal may receive the basic broadcast signal at the corresponding time-frequency position on each frequency resource, without simultaneously receiving the basic broadcast signal at the corresponding time-frequency positions on two frequency resources, such that resources may be saved. Referring to FIG. 5 which shows a schematic diagram of receiving a basic broadcast signal, an arrow is used to indicate that a DSP chip receives the basic broadcast signal at a corresponding time slot position on a frequency resource.

Of course, the terminal may also simultaneously receive the basic broadcast signal at the corresponding time-frequency positions on two frequency resources, respectively. In this case, two overlapped arrows should be used to indicate that the DSP chip simultaneously receives the basic broadcast signal at the corresponding slot positions on the two frequency resources, respectively.

In step 305, when the synchronization signal is received only on the first frequency resource, a fifth frequency domain position and a ninth time domain position of the basic broadcast signal which appears on the first frequency resource are determined according to the synchronization signal, and a tenth time domain position of the basic broadcast signal which appears on the second frequency resource is determined according to the ninth time domain position. The basic broadcast signal is received on the first frequency resource according to the fifth frequency domain position and the ninth time domain position, the basic broadcast signal is received on the second frequency resource according to the tenth time domain position. Alternatively, when the synchronization signal is received only on the second frequency resource, a sixth frequency domain position and an eleventh time domain position of the basic broadcast signal which appears on the second frequency resource are determined according to the synchronization signal. A twelfth time domain position of the basic broadcast signal which appears on the first frequency resource is determined according to the eleventh time domain position. The basic broadcast signal is received on the second frequency resource according to the sixth frequency domain position and the eleventh time domain position. The basic broadcast signal is received on the first frequency resource according to the twelfth time domain position.

The terminal only receives the synchronization signal on the first frequency resource, that is, the synchronization signal is only transmitted on the first frequency resource. After receiving the synchronization signal, the terminal may determine, according to the synchronization signal, the fifth frequency domain of the basic broadcast signal transmitted on the first frequency resource, then determine the ninth time domain position of the basic broadcast signal, and receive the basic broadcast signal on the first frequency resource according to the fifth frequency domain position and the ninth time domain position. Since the period in which the basic broadcast signal is alternately transmitted on the first frequency resource and the second frequency resource is known, the terminal may calculate, according to the ninth time domain position and period of the basic broadcast signal transmitted on the first frequency resource, the tenth time domain position of the basic broadcast signal transmitted on the second frequency resource, and blindly search for the basic broadcast signal on the second frequency resource according to the tenth time domain position.

Assuming that the terminal receives the basic broadcast signal on the frequency resource corresponding to 15 kHz at the current time, it may be determined that the time domain position of the basic broadcast signal on the frequency resource corresponding to 60 kHz is y/2 ms. After waiting for y/2 ms, the terminal blindly searches for the basic broadcast signal on the frequency resource corresponding to 60 kHz.

The terminal only receives the synchronization signal on the second frequency resource, that is, the synchronization signal is only transmitted on the second frequency resource. After receiving the synchronization signal, the terminal may determine the sixth frequency domain position of the basic broadcast signal transmitted on the second frequency resource according to the synchronization signal, then determine the eleventh time domain position of the basic broadcast signal, and receive the basic broadcast signal on the second frequency resource according to the sixth frequency domain position and the eleventh time domain position. Since the period of the basic broadcast signal which is alternately transmitted on the first frequency resource and the second frequency resource is known, the terminal may calculate, according to the eleventh time domain position and period of the basic broadcast signal transmitted on the second frequency resource, the twelfth time domain position of the basic broadcast signal transmitted on the first frequency resource, and blindly search for the basic broadcast signal on the first frequency resource according to the twelfth time domain position.

In summary, according to the method for receiving a signal provided by the present disclosure, the first frequency domain position, corresponding to the first subcarrier spacing, of the signal to be received and the second frequency domain position, corresponding to the second subcarrier spacing, of the signal are determined according to the frequency band which the terminal supports. The first frequency resource allocated for the first subcarrier spacing and the second frequency resource allocated for the second subcarrier spacing in the frequency band are determined. The signal is received on the first frequency resource according to the first frequency domain position, and the signal is received on the second frequency resource according to the second frequency domain position; such that the terminal supports two system signal configurations, and the subcarrier spacings in the system signal configurations are different, the signal can be received simultaneously on the frequency resources corresponding to the two subcarrier spacings, respectively. Therefore, the problem that the terminal could not meet the multiple service demands caused by receiving a signal on a frequency resource corresponding to one subcarrier spacing is solved, and expanded service demands of a terminal can be met.

When part of the signal is received on the first frequency resource, a second time domain position of next occurrence of the signal on the second frequency resource is determined according to the current first time domain position of the signal. Since the second time domain position is earlier than a third time domain position of next occurrence of the signal on the first frequency resource, the terminal may shorten the period of receiving the synchronization signal, thereby improving the reception efficiency of the synchronization signal.

Figure 6:
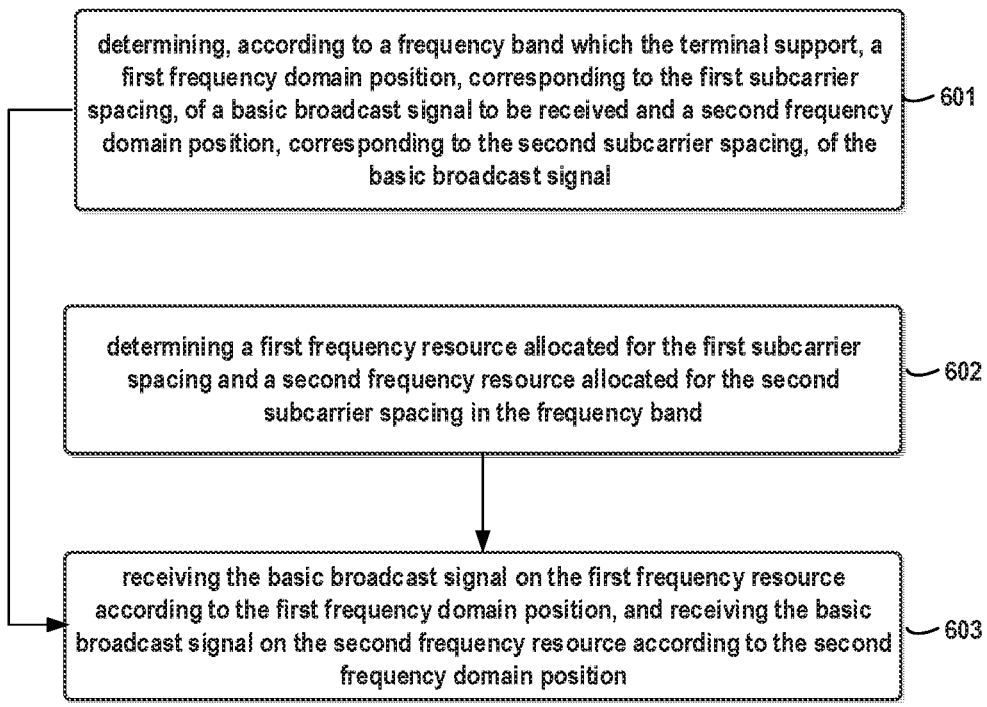
FIG. 6 is a flowchart of a method for receiving a signal in accordance with another exemplary embodiment.

FIG. 6 is a flowchart of a method for receiving a signal in accordance with another exemplary embodiment. The method for receiving a signal is applied to the terminal 120 shown in FIG. 1 and the signal is a basic broadcast signal. As shown in FIG. 6, the method for receiving a signal includes the following steps.

In step 601, determining, according to a frequency band which the terminal support, a first frequency domain position, corresponding to the first subcarrier spacing, of a basic broadcast signal to be received and a second frequency domain position, corresponding to the second subcarrier spacing, of the basic broadcast signal.

In step 602, determining a first frequency resource allocated for the first subcarrier spacing and a second frequency resource allocated for the second subcarrier spacing in the frequency band.

In step 603, receiving the basic broadcast signal on the first frequency resource according to the first frequency domain position, and receiving the basic broadcast signal on the second frequency resource according to the second frequency domain position.

The process in which the terminal simultaneously receives the basic broadcast signal on the first frequency resource and the second frequency resource, which is the same as the process in which the terminal simultaneously receives the synchronization signal on the first frequency resource and the second frequency resource, is described in the embodiment shown in FIG. 3 and will not be described here again.

It should be noted that: when the signal is the basic broadcast signal, the terminal also needs to receive the synchronization signal before receiving the basic broadcast signal. The process of receiving the synchronization signal is described in detail in the embodiment shown in FIG. 3, and will not be described herein.

In summary, according to the method for receiving a signal provided by the present disclosure, the first frequency domain position, corresponding to the first subcarrier spacing, of the signal to be received and the second frequency domain position, corresponding to the second subcarrier spacing, of the signal are determined according to the frequency band which the terminal supports. The first frequency resource allocated for the first subcarrier spacing and the second frequency resource allocated for the second subcarrier spacing in the frequency band are determined. The signal is received on the first frequency resource according to the first frequency domain position, and the signal is received on the second frequency resource according to the second frequency domain position, such that the terminal supports two system signal configurations. In addition, when the subcarrier spacings in the system signal configurations are different, the signal can be received simultaneously on the frequency resources corresponding to the two subcarrier spacings, respectively. Therefore, the problem that the terminal could not meet the multiple service demands caused by receiving a signal on a frequency resource corresponding to one subcarrier spacing is solved, and expanded service demands of a terminal can be met.

Figure 7:
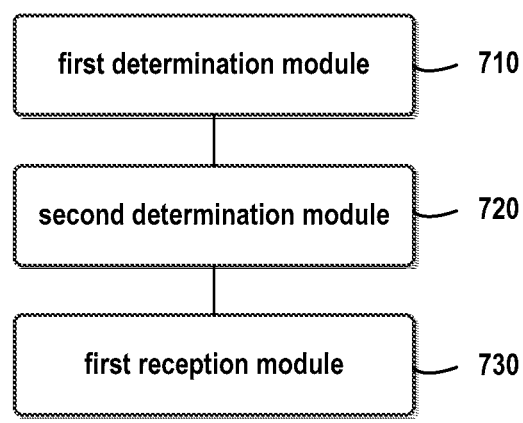
FIG. 7 is a block diagram of an apparatus for receiving a signal in accordance with an exemplary embodiment.

FIG. 7 is a block diagram of an apparatus for receiving a signal in accordance with an exemplary embodiment. The apparatus for receiving a signal is applied to the terminal 120 shown in FIG. 1. As shown in FIG. 7, the apparatus for receiving a signal includes: a first determination module 710, a second determination module 720 and a first reception module 730.

The first determination module 710 is configured to determine, according to a frequency band which the terminal supports, a first frequency domain position, corresponding to the first subcarrier spacing, of a signal to be received and a second frequency domain position, corresponding to the second subcarrier spacing, of the signal, the signal being a synchronization signal or a basic broadcast signal.

The second determination module 720 is configured to determine a first frequency resource allocated for the first subcarrier spacing and a second frequency resource allocated for the second subcarrier spacing in the frequency band.

The first reception module 730 is configured to receive the signal on the first frequency resource determined by the second determination module 720 according to the first frequency domain position determined by the first determination module 710, and receive the signal on the second frequency resource determined by the second determination module 720 according to the second frequency domain position determined by the first determination module 710.

In summary, according to the apparatus for receiving a signal provided by the present disclosure, the first frequency domain position, corresponding to the first subcarrier spacing, of the signal to be received and the second frequency domain position, corresponding to the second subcarrier spacing, of the signal are determined according to the frequency band which the terminal supports. The first frequency resource allocated for the first subcarrier spacing and the second frequency resource allocated for the second subcarrier spacing in the frequency band are determined. The signal is received on the first frequency resource according to the first frequency domain position, and the signal is received on the second frequency resource according to the second frequency domain position: such that the terminal supports two system signal configurations, and the subcarrier spacings in the system signal configurations are different, the signal can be received simultaneously on the frequency resources corresponding to the two subcarrier spacings, respectively. Therefore, the problem, which caused by receiving a signal on a frequency resource corresponding to one subcarrier spacing, that the terminal could not meet the multiple service demands is solved, and expanded service demands of a terminal can be met.

Figure 8:
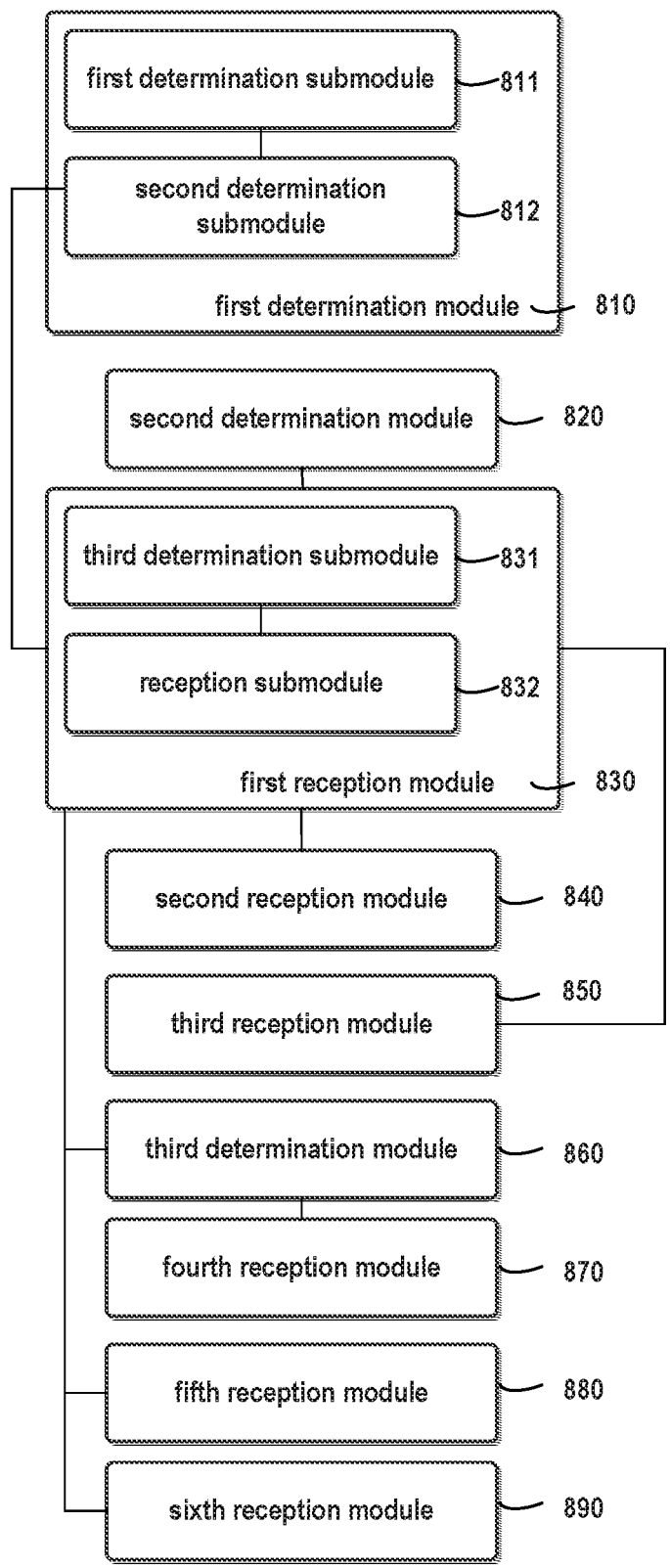
FIG. 8 is a block diagram of an apparatus for receiving a signal in accordance with an exemplary embodiment.

FIG. 8 is a block diagram of an apparatus for receiving a signal in accordance with an exemplary embodiment. The apparatus for receiving a signal is applied to the terminal 120 shown in FIG. 1. As shown in FIG. 8, the apparatus for receiving a signal includes: a first determination module 810, a second determination module 820 and a first reception module 830.

The first determination module 810 is configured to determine, according to a frequency band which the terminal supports, a first frequency domain position, corresponding to the first subcarrier spacing, of a signal to be received and a second frequency domain position, corresponding to the second subcarrier spacing, of the signal, the signal being a synchronization signal or a basic broadcast signal.

The second determination module 820 is configured to determine a first frequency resource allocated for the first subcarrier spacing and a second frequency resource allocated for the second subcarrier spacing in the frequency band.

The first reception module 830 is configured to receive the signal on the first frequency resource determined by the second determination module 820 according to the first frequency domain position determined by the first determination module 810, and receive the signal on the second frequency resource determined by the second determination module 820 according to the second frequency domain position determined by the first determination module 810.

Optionally, when the signal is the synchronization signal, the apparatus further includes: a second reception module 840 or a third reception module 850.

The second reception module 840 is configured to, when part of the signal is received on the first frequency resource, determine, according to a current first time domain position of the signal, a second time domain position of next occurrence of the signal on the second frequency resource: when the second time domain position is reached, receive the signal on the first frequency resource according to the first frequency domain position, and receive the signal on the second frequency domain resource according to the second frequency domain position, the second time domain position being earlier than a third time domain position of next occurrence of the signal on the first frequency resource.

The third reception module 850 is configured to, when part of the signal is received on the second frequency resource, determine, according to a current fourth time domain position of the signal, a fifth time domain position of next occurrence of the signal on the first frequency resource; when the fifth time domain position is reached, receive the signal on the first frequency resource according to the first frequency domain position, and receive the signal on the second frequency domain resource according to the second frequency domain position, the fifth time domain position being earlier than a sixth time domain position of next occurrence of the signal on the second frequency resource.

Optionally, the first determination module 810 includes:

a first determination submodule 811 configured to shift a preset frequency resource block located at a center frequency point of the frequency band upwardly by a first threshold corresponding to the first subcarrier spacing, to obtain a first frequency resource block, and determine, according to a first positional relationship between the signal and the first frequency resource block, the first frequency domain position of the signal; and a second determination submodule 812 configured to shift the preset frequency resource block downwardly by a second threshold corresponding to the second subcarrier spacing, to obtain a second frequency resource block, and determine the second frequency domain position of the signal according to a second positional relationship between the signal and the second frequency resource block.

Optionally, the first reception module 830 includes: a third determination submodule 831 and a reception submodule 832;

the third determination submodule 831 configured to determine a first frequency grid corresponding to the first subcarrier spacing and a second frequency grid corresponding to the second subcarrier spacing: and the reception submodule 832 configured to scan, on the first frequency resource, the signal at intervals of the first frequency grid via a first scanning window having the same size as the first frequency resource block; and scan, on the second frequency resource, the signal at intervals of the second frequency grid via a second scanning window having the same size as the second frequency resource block.

Optionally, the apparatus further includes: a third determination module 860 and a fourth reception module 870:

the third determination module 860 configured to, when the signal is a synchronization signal and the synchronization signal is received on both the first frequency resource and the second frequency resource, determine, according to the synchronization signal received on the first frequency resource, a third frequency domain position and a seventh time domain position of the basic broadcast signal which appears on the first frequency resource: and determine, according to the synchronization signal received on the second frequency resource, a fourth frequency domain position and an eighth time domain position of the basic broadcast signal which appears on the second frequency resource: and the fourth reception module 870 configured to receive the basic broadcast signal on the first frequency resource according to the third frequency domain position and the seventh time domain position determined by the third determination module, and receive the basic broadcast signal on the second frequency resource according to the fourth frequency domain position and the eighth time domain position.

Optionally, the apparatus further includes: a fifth reception module 880 or a sixth reception module 890.

The fifth reception module 880 is configured to, when the signal is a synchronization signal and the synchronization signal is received only on the first frequency resource, determine, according to the synchronization signal, a fifth frequency domain position and a ninth time domain position of the basic broadcast signal which appears on the first frequency resource, and determine, according to the ninth time domain position, a tenth time domain position of the basic broadcast signal which appears on the second frequency resource; receive the basic broadcast signal on the first frequency resource according to the fifth frequency domain position and the ninth time domain position, and receive the basic broadcast signal on the second frequency resource according to the tenth time domain position; or the a sixth reception module 890 is configured to, when the signal is a synchronization signal and the synchronization signal is received only on the second frequency resource, determine, according to the synchronization signal, a sixth frequency domain position and an eleventh time domain position of the basic broadcast signal which appears on the second frequency resource, and determine, according to the eleventh time domain position, a twelfth time domain position of the basic broadcast signal which appears on the first frequency resource; receive the basic broadcast signal on the second frequency resource according to the sixth frequency domain position and the eleventh time domain position, and receive the basic broadcast signal on the first frequency resource according to the twelfth time domain position.

In summary, according to the apparatus for receiving a signal provided by the present disclosure, the first frequency domain position, corresponding to the first subcarrier spacing, of the signal to be received and the second frequency domain position, corresponding to the second subcarrier spacing, of the signal are determined according to the frequency band which the terminal supports. The first frequency resource allocated for the first subcarrier spacing and the second frequency resource allocated for the second subcarrier spacing in the frequency band are determined. The signal is received on the first frequency resource according to the first frequency domain position, and the signal is received on the second frequency resource according to the second frequency domain position; such that the terminal supports two system signal configurations, and the subcarrier spacings in the system signal configurations are different, the signal can be received simultaneously on the frequency resources corresponding to the two subcarrier spacings, respectively. Therefore, the problem, which is caused by the terminal receives a signal only on a frequency resource corresponding to one subcarrier spacing, that the terminal could not meet the multiple service demands is solved, and expanded service demands of a terminal can be met.

When part of the signal is received on the first frequency resource, the second time domain position of next occurrence of the signal on the second frequency resource is determined according to the current first time domain position of the signal. Since the second time domain position is earlier than the third time domain position of next occurrence of the signal on the first frequency resource, the terminal may shorten the period of receiving the synchronization signal, thereby improving the reception efficiency of the synchronization signal.

With regard to the apparatus in the above embodiments, the specific operations which respective modules perform has been described in detail in the embodiment relating to the method, and will not be explained in detail herein.

An exemplary embodiment of the present disclosure provides an apparatus for receiving a signal, which is applied to a terminal 120 shown in FIG. 1 and is capable of realizing the method for receiving a signal provided by the present disclosure. The apparatus for receiving a signal includes: a processor, and a memory for storing executable instructions of the processor, wherein the processor is configured to:

determine, according to a frequency band which the terminal supports, a first frequency domain position, corresponding to a first subcarrier spacing, of a signal to be received and a second frequency domain position, corresponding to a second subcarrier spacing, of the signal, the signal being a synchronization signal or a basic broadcast signal;

determine a first frequency resource allocated for the first subcarrier spacing and a second frequency resource allocated for the second subcarrier spacing in the frequency band: and receive the signal on the first frequency resource according to the first frequency domain position, and receive the signal on the second frequency resource according to the second frequency domain position.

Figure 9:
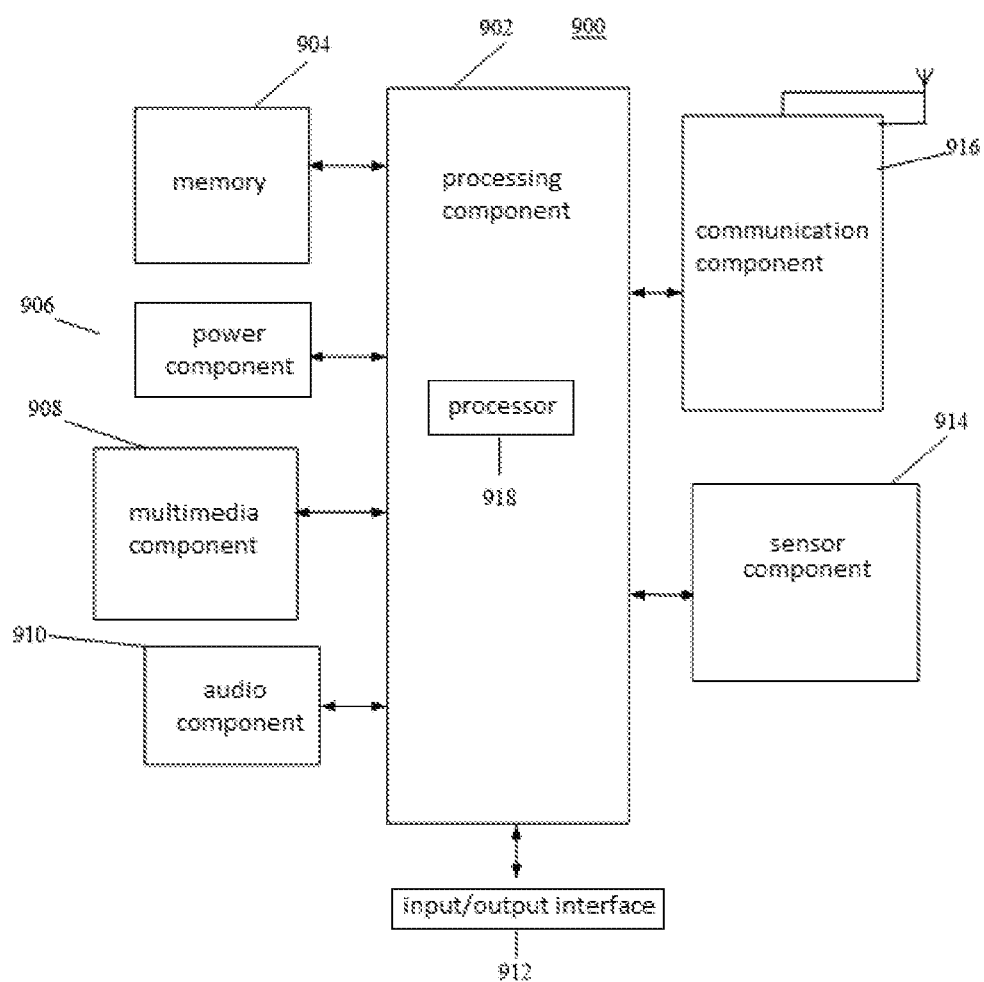
FIG. 9 is a block diagram of an apparatus for receiving a signal in accordance with an exemplary embodiment.

FIG. 9 is a block diagram of an apparatus 900 for receiving a signal in accordance with an exemplary embodiment. For example, the apparatus 900 may be a mobile phone, a computer, a digital broadcast terminal, a messaging device, a gaming console, a tablet device, a medical device, a fitness equipment, a personal digital assistant, and the like.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the apparatus 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, videos, etc. The memory 904 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 908 includes a front camera and/or a rear camera. The front camera and the rear camera may receive external multimedia data while the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive external audio signals when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker for outputting audio signals.

The I/O interface 912 provides an interface between the processing component 902 and peripheral interface modules, such as a keyboard, a click wheel, buttons, and the like.

The buttons may include, but are not limited to, a home button, a volume button, a start button, and a lock button.

The sensor component 914 includes one or more sensors to provide status assessments of various aspects of the apparatus 900. For instance, the sensor component 914 may detect an on/off status of the apparatus 900, relative positioning of components, e.g., the display device and the mini keyboard of the apparatus 900, and the sensor component 914 may also detect a position change of the apparatus 900 or a component of the apparatus 900, presence or absence of user contact with the apparatus 900, orientation or acceleration/deceleration of the apparatus 900, and temperature change of the apparatus 900. The sensor component 914 may include a proximity sensor configured to detect the presence of nearby objects without any physical contact. The sensor component 914 may also include a light sensor, such as a CMOS or CCD image sensor, used for imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The apparatus 900 can access a wireless network based on a communication standard, such as WiFi, 2G, or 3G, or a combination thereof. In an exemplary embodiment, the communication component 916 receives broadcast signals or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as—the memory 904 including instructions, executable by the processor 918 in the apparatus 900, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for receiving a signal, applied to a terminal supporting a first system signal configuration and a second system signal configuration, a first subcarrier spacing in the first system signal configuration being different from a second subcarrier spacing in the second system signal configuration, the method comprising:

determining, according to a frequency band that the terminal supports, a first frequency domain position, corresponding to the first subcarrier spacing, of a signal to be received and a second frequency domain position, corresponding to the second subcarrier spacing, of the signal, the signal being a synchronization signal or a basic broadcast signal, wherein the determining comprises:

shifting a preset frequency resource block located at a center frequency point of the frequency band upwardly by a first threshold corresponding to the first subcarrier spacing, to obtain a first frequency resource block, and determining the first frequency domain position of the signal according to a first positional relationship between the signal and the first frequency resource block; and shifting the preset frequency resource block downwardly by a second threshold corresponding to the second subcarrier spacing, to obtain a second frequency resource block, and determining the second frequency domain position of the signal according to a second positional relationship between the signal and the second frequency resource block;

determining a first frequency resource allocated for the first subcarrier spacing and a second frequency resource allocated for the second subcarrier spacing in the frequency band; and receiving the signal on the first frequency resource according to the first frequency domain position, and receiving the signal on the second frequency resource according to the second frequency domain position.

2. The method according to claim 1, wherein the signal is a synchronization signal, the method further comprising:

when part of the signal is received on the first frequency resource, determining, according to a current first time domain position of the signal, a second time domain position of next occurrence of the signal on the second frequency resource; when the second time domain position is reached, receiving the signal on the first frequency resource according to the first frequency domain position, and receiving the signal on the second frequency domain resource according to the second frequency domain position, the second time domain position being earlier than a third time domain position of next occurrence of the signal on the first frequency resource.

3. The method according to claim 1, wherein the receiving the signal on the first frequency resource according to the first frequency domain position, and receiving the signal on the second frequency resource according to the second frequency domain position, comprises:

determining a first frequency grid corresponding to the first subcarrier spacing and a second frequency grid corresponding to the second subcarrier spacing; and scanning, on the first frequency resource, the signal at intervals of the first frequency grid via a first scanning window having the same size as the first frequency resource block; and scanning, on the second frequency resource, the signal at intervals of the second frequency grid via a second scanning window having the same size as the second frequency resource block.

4. The method according to claim 1, further comprising: when the signal is a synchronization signal and the synchronization signal is received on both the first frequency resource and the second frequency resource, determining, according to the synchronization signal received on the first frequency resource, a third frequency domain position and a first time domain position of a basic broadcast signal which appears on the first frequency resource; and determining, according to the synchronization signal received on the second frequency resource, a fourth frequency domain position and a second time domain position of the basic broadcast signal which appears on the second frequency resource; and receiving the basic broadcast signal on the first frequency resource according to the third frequency domain position and the first time domain position, and receiving the basic broadcast signal on the second frequency resource according to the fourth frequency domain position and the second time domain position.

5. The method according to claim 1, further comprising: when the signal is a synchronization signal and the synchronization signal is received only on the first frequency resource, determining, according to the synchronization signal, a third frequency domain position and a first time domain position of the basic broadcast signal which appears on the first frequency resource, and determining, according to the first time domain position, a second time domain position of the basic broadcast signal which appears on the second frequency resource; receiving the basic broadcast signal on the first frequency resource according to the third frequency domain position and the first time domain position, and receiving the basic broadcast signal on the second frequency resource according to the second time domain position.

6. An apparatus for receiving a signal, applied to a terminal supporting a first system signal configuration and a second system signal configuration, a first subcarrier spacing in the first system signal configuration being different from a second subcarrier spacing in the second system signal configuration; the apparatus comprising:
a processor; and
a memory storing instructions executable by the processor;
wherein the processor is configured to:
determine, according to a frequency band which the terminal supports, a first frequency domain position, corresponding to the first subcarrier spacing, of a signal to be received and a second frequency domain position, corresponding to the second subcarrier spacing, of the signal, the signal being a synchronization signal or a basic broadcast signal, wherein the determining comprises:
shifting a preset frequency resource block located at a center frequency point of the frequency band upwardly by a first threshold corresponding to the first subcarrier spacing, to obtain a first frequency resource block, and determining the first frequency domain position of the signal according to a first positional relationship between the signal and the first frequency resource block; and shifting the preset frequency resource block downwardly by a second threshold corresponding to the second subcarrier spacing, to obtain a second frequency resource block, and determining the second frequency domain position of the signal according to a second positional relationship between the signal and the second frequency resource block;

determine a first frequency resource allocated for the first subcarrier spacing and a second frequency resource allocated for the second subcarrier spacing in the frequency band; and receive the signal on the first frequency resource according to the first frequency domain position, and receive the signal on the second frequency resource according to the second frequency domain position.

7. The apparatus according to claim 6, when the signal is the synchronization signal, and the processor is further configured to:
when part of the content of the signal is received on the first frequency resource, determine, according to a current first time domain position of the signal, a second time domain position of next occurrence of the signal on the second frequency resource; when the second time domain position is reached, receive the signal on the first frequency resource according to the first frequency domain position, and receive the signal on the second frequency domain resource according to the second frequency domain position, the second time domain position being earlier than a third time domain position of the signal which appears on the first frequency resource next time.

8. The apparatus according to claim 6, wherein the processor is further configured to:
determine a first frequency grid corresponding to the first subcarrier spacing and a second frequency grid corresponding to the second subcarrier spacing; and
scan, on the first frequency resource, the signal at intervals of the first frequency grid via a first scanning window having the same size as the first frequency resource block; and scan, on the second frequency resource, the signal at intervals of the second frequency grid via a second scanning window having the same size as the second frequency resource block.

9. The apparatus according to claim 6, wherein the processor is further configured to:
when the signal is a synchronization signal and the synchronization signal is received on both the first frequency resource and the second frequency resource, determine, according to the synchronization signal received on the first frequency resource, a third frequency domain position and a first time domain position of the basic broadcast signal which appears on the first frequency resource; and determine, according to the synchronization signal received on the second frequency resource, a fourth frequency domain position and a second time domain position of the basic broadcast signal which appears on the second frequency resource; and receive the basic broadcast signal on the first frequency resource according to the third frequency domain position and the first time domain position, and receive the basic broadcast signal on the second frequency resource according to the fourth frequency domain position and the second time domain position.

10. The apparatus according to claim 6, wherein the processor is further configured to:

when the signal is a synchronization signal and the synchronization signal is received only on the first frequency resource, determine, according to the synchronization signal, a third frequency domain position and a first time domain position of the basic broadcast signal which appears on the first frequency resource, and determine, according to the ninth time domain position, a second time domain position of the basic broadcast signal which appears on the second frequency resource; receive the basic broadcast signal on both the first frequency resource according to the third frequency domain position and the first time domain position, and receive the basic broadcast signal on the second frequency resource according to the second time domain position.

11. The method according to claim 1, wherein the signal is a synchronization signal, the method further comprising:
when part of the signal is received on the second frequency resource, determining, according to a current first time domain position of the signal, a second time domain position of next occurrence of the signal on the first frequency resource; when the second time domain position is reached, receiving the signal on the first frequency resource according to the first frequency domain position, and receiving the signal on the second frequency domain resource according to the second frequency domain position, the second time domain position is earlier than a third time domain position of next occurrence of the signal on the second frequency resource.

12. The method according to claim 1, further comprising:
when the signal is a synchronization signal and the synchronization signal is received only on the second frequency resource, determining, according to the synchronization signal, a third frequency domain position and a first time domain position of the basic broadcast signal which appears on the second frequency resource, and determining, according to the first time domain position, a second time domain position of the basic broadcast signal which appears on the first frequency resource; receiving the basic broadcast signal on the second frequency resource according to the third frequency domain position and the first time domain position, and receiving the basic broadcast signal on the first frequency resource according to the second time domain position.

13. The apparatus according to claim 6, when the signal is the synchronization signal, and the processor is further configured to:
when part of the signal is received on the second frequency resource, determine, according to a current first time domain position of the signal, a second time domain position of next occurrence of the signal on the first frequency resource; when the second time domain position is reached, receive the signal on the first frequency resource according to the first frequency domain position, and receive the signal on the second frequency domain resource according to the second frequency domain position, the second time domain position being earlier than a third time domain position of the signal which appears on the second frequency resource next time.

14. The apparatus according to claim 6, wherein the processor is further configured to:
when the signal is a synchronization signal and the synchronization signal is received only on the second frequency resource, determine, according to the synchronization signal, a third frequency domain position and a first time domain position of the basic broadcast signal which appears on the second frequency resource, and determine, according to the first time domain position, a second time domain position of the basic broadcast signal which appears on the first frequency resource; receive the basic broadcast signal on the second frequency resource according to the third frequency domain position and the first time domain position, and receive the basic broadcast signal on the first frequency resource according to the second time domain position.

* * * * *